US008526171B2

(12) United States Patent
Wu et al.

(10) Patent No.: US 8,526,171 B2
(45) Date of Patent: Sep. 3, 2013

(54) SUPPORTING STRUCTURE MODULE AND ELECTRONIC DEVICE USING THE SAME

(75) Inventors: Jiun-Lin Wu, Taipei (TW); Chia-Hsiang Hsiang, Taipei (TW); Ching-Hao Yu, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 212 days.

(21) Appl. No.: 13/160,519

(22) Filed: Jun. 15, 2011

(65) Prior Publication Data
US 2011/0310541 A1 Dec. 22, 2011

(30) Foreign Application Priority Data
Jun. 22, 2010 (TW) .............................. 99120290 A (51) Int. Cl.
*G06F 1/16* (2006.01)

(52) U.S. Cl.
USPC ......... 361/679.02; 257/676; 174/520; 16/342

(58) Field of Classification Search
USPC ................. 343/702, 700 MS, 713; 257/676, 257/787–796; 361/679.02, 679.27, 679.28, 361/679.29, 679.13, 679.05, 679.08, 679.56; 174/126.2, 255, 69, 72 A, 50, 50.5, 520; 16/333, 334, 224, 252, 366, 342

See application file for complete search history.

(56) References Cited

U.S. PATENT DOCUMENTS

| 5,678,206 A | 10/1997 | Ishii |
| 7,158,083 B2 * | 1/2007 | Satoh et al. ................... 343/702 |
| 7,932,587 B2 * | 4/2011 | Lehmann ..................... 257/676 |
| 8,362,617 B2 * | 1/2013 | Nikitin et al. ................. 257/773 |
| 2009/0065915 A1 * | 3/2009 | Lehmann ...................... 257/676 |
| 2010/0016038 A1 | 1/2010 | Demuynck |

FOREIGN PATENT DOCUMENTS

| CN | 1717129 A | 1/2006 |
| CN | 101727138 A | 6/2010 |
| JP | H08298538 A | 11/1996 |
| JP | 2003241851 A | 8/2003 |
| JP | 200914099 A | 1/2009 |
| JP | 2009133492 A | 6/2009 |
| JP | 2009201058 A | 9/2009 |
| TW | M340691 | 9/2008 |
| TW | M341244 | 9/2008 |
| TW | 200922443 | 5/2009 |

* cited by examiner

*Primary Examiner* — Hung Duong
(74) *Attorney, Agent, or Firm* — Winston Hsu; Scott Margo (57) ABSTRACT

This disclosure provides a supporting structure module and an electronic device using the same. The supporting structure module in the invention is used in the electronic device. The electronic device includes a first casing, a hinge, and a second casing rotatable relative to the first casing via the hinge. The supporting structure module includes a first supporting structure, and the first supporting structure includes a first bracket and a first hinge cover. The first bracket is fixed to and exposed from the first casing. The first hinge cover is connected with the first bracket by integral forming, and the first hinge cover is exposed from the first casing and covers a part of the hinge.

18 Claims, 8 Drawing Sheets

SUPPORTING STRUCTURE MODULE AND ELECTRONIC DEVICE USING THE SAME

CROSS-REFERENCE TO RELATED APPLICATIONS

This Non-provisional application claims priority under 35 U.S.C. §119(a) on Patent Application No(s). 099120290 filed in Taiwan, Republic of China on Jun. 22, 2010, the entire contents of which are hereby incorporated by reference.

BACKGROUND OF THE INVENTION

1. Field of the Invention

This invention relates to a supporting structure module and an electronic device using the same and, more particularly, to a supporting structure module exposed as exterior part and an electronic device using the same.

2. Description of the Related Art

With improvement of semiconductor elements and display technology, electronic devices continuously develop to be miniaturized, multi-function, and be conveniently carried. Common portable electronic devices include a personal digital assistant, a mobile phone, a notebook computer and so on. The portable electronic devices can be folded to reduce a storage area, such that the electronic products are light, slim, short, and small. A notebook computer is taken for example. The common notebook computer mostly includes a main body and a display device, and the main body and the display device are pivotally connected with each other. A user can close the main body and the display device of the notebook computer via relative rotation of the main body and the display device thus to facilitate carrying, and the user can open the display device to facilitate operation when the user is to use the notebook computer.

Generally speaking, a hinge may be disposed between the main body and the display device of the notebook computer, such that the main body and the display device can be rotated relative to each other to be opened or closed. Casings of many notebook computers have exterior elements for covering the hinges, allowing the whole structures to have better appearances. When screws are used to screw the exterior elements to the casings, structure elements may not cooperate precisely and stress may be concentrated. Thus, the structure is easily damaged when the main body and the display device are rotated relative to each other via the hinge. Further, the exterior elements and the screws may increase manufacture costs and time.

SUMMARY

According to the above, this disclosure provides a supporting structure module capable of being exposed as an exterior element, and the supporting structure module is integrally formed and replaces an original bracket and hinge cover in an electronic device.

The embodiment of the invention provides a supporting structure module and an electronic device. The electronic device includes a first casing, a hinge, and a second casing rotatable relative to the first casing via the hinge. The supporting structure module includes a first supporting structure, and the first supporting structure includes a first bracket and a first hinge cover. The first bracket is fixed to and exposed from the first casing. The first hinge cover is connected with the first bracket by integral forming, and the first hinge cover is exposed from the first casing and covers a part of the hinge.

In one embodiment of the invention, the supporting structure module may include a second supporting structure including a second bracket and a second hinge cover. The second bracket is fixed to and exposed from the second casing. The second hinge cover is connected with the second bracket by integral forming, and the second hinge cover is exposed from the second casing and covers the rest part of the hinge.

In one embodiment of the invention, the first bracket of the first supporting structure may extend along edges of the first casing. The numbers of the hinge and the first hinge cover may be two, respectively, and the first hinge covers may be disposed at two ends of a side of the first bracket adjacent to the second casing, respectively.

In one embodiment of the invention, the second bracket of the second supporting structure may extend along edges of the second casing. The number of the second hinge cover may be two, and the second hinge covers may be disposed at two ends of a side of the second bracket adjacent to the first casing, respectively, and may be connected with the two first hinge covers to cover the two hinges together with the two first hinge covers.

In one embodiment of the invention, the hinge may include a first shaft and a second shaft. The first shaft is fixedly connected with the first hinge cover of the first supporting structure. The second shaft is fixedly connected with the second hinge cover of the second supporting structure and is pivotally connected with the first shaft.

In one embodiment of the invention, the first hinge cover of the first supporting structure may have an assembling hole, and a tail end of the first shaft may be embedded into the assembling hole.

In one embodiment of the invention, the second hinge cover of the second supporting structure may have at least one groove, and the second shaft may have at least one hook. The hook may be fastened to the groove.

In one embodiment of the invention, the hinge may include a torsion element connected with the first shaft and the second shaft, and the first shaft and the second shaft may resist torsion force provided by the torsion element to rotate relative to each other.

In one embodiment of the invention, the supporting structure may include a supporting bracket connected with the first hinge cover of the first supporting structure for supporting the first casing on a surface.

In one embodiment of the invention, the first supporting structure and the second supporting structure may be made of an aluminum alloy or a zinc alloy.

The embodiment of the invention provides an electronic device including a first casing, a hinge, a second casing rotatable relative to the first casing via the hinge, and a first supporting structure. The first supporting structure includes a first bracket and a first hinge cover. The first bracket is fixed to and exposed from the first casing. The first hinge cover is connected with the first bracket by integral forming, and the first hinge cover is exposed from the first casing and covers a part of the hinge.

In one embodiment of the invention, the electronic device may include a second supporting structure including a second bracket and a second hinge cover. The second bracket is fixed to and exposed from the second casing. The second hinge cover is connected with the second bracket by integral forming, and the second hinge cover is exposed from the second casing and covers the rest part of the hinge.

In one embodiment of the invention, the first bracket of the first supporting structure may extend along edges of the first casing. The number of the hinge and the first hinge cover may be two, and the first hinge covers may be disposed at two ends of a side of the first bracket adjacent to the second casing, respectively.

In one embodiment of the invention, the second bracket of the second supporting structure may extend along edges of the second casing. The number of the second hinge cover may be two, and the second hinge covers may be disposed at two ends of a side of the second bracket adjacent to the first casing, respectively, and may be connected with the two first hinge covers to cover the two hinges together with the two first hinge covers.

In one embodiment of the invention, the electronic device may include a cable covering structure connected with the first casing and the second casing and located between the two hinges. The cable covering structure has a plurality of passages extending between the first casing and the second casing, and a plurality of cables of the electronic device are disposed in the passages.

In one embodiment of the invention, the cable covering structure may be made of rubber.

In one embodiment of the invention, the hinge may include a first shaft and a second shaft. The first shaft is fixedly connected with the first hinge cover of the first supporting structure. The second shaft is fixedly connected with the second hinge cover of the second supporting structure and is pivotally connected with the first shaft.

In one embodiment of the invention, the first hinge cover of the first supporting structure may have an assembling hole, and a tail end of the first shaft may be embedded into the assembling hole.

In one embodiment of the invention, the second hinge cover of the second supporting structure may have at least one groove, and the second shaft may have at least one hook. The hook may be fastened to the groove.

In one embodiment of the invention, the hinge may include a torsion element connected with the first shaft and the second shaft, and the first shaft and the second shaft may resist torsion force provided by the torsion element to rotate relative to each other.

In one embodiment of the invention, the electronic device may include a supporting bracket connected with the first hinge cover of the first supporting structure for supporting the first casing on a surface.

In one embodiment of the invention, the first supporting structure and the second supporting structure may be made of an aluminum alloy or a zinc alloy.

According to the above, the hinge in the disclosure is covered by the hinge cover of the supporting structure and is not exposed. Thus, an additional exterior element may be not needed for covering the hinge in a screwing mode. Further, the problems that structure elements cannot cooperate precisely due to the screwing of screws or stress is concentrated can be avoided, thereby reducing probability of structure damage when the first casing and the second casing are rotated relative to each other via the hinge.

These and other features, aspects, and advantages of the present invention will become better understood with regard to the following description, appended claims, and accompanying drawings.

DETAILED DESCRIPTION OF THE INVENTION

Figure 1:
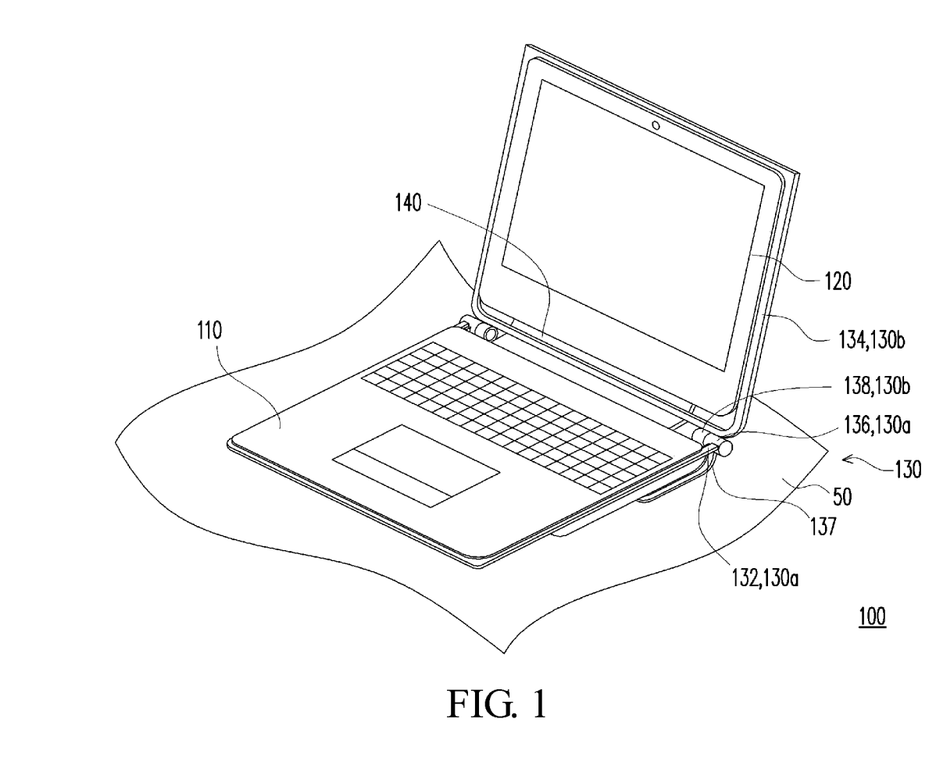
FIG. 1 is a three-dimensional diagram showing an electronic device according to one embodiment of this invention.
Figure 2:
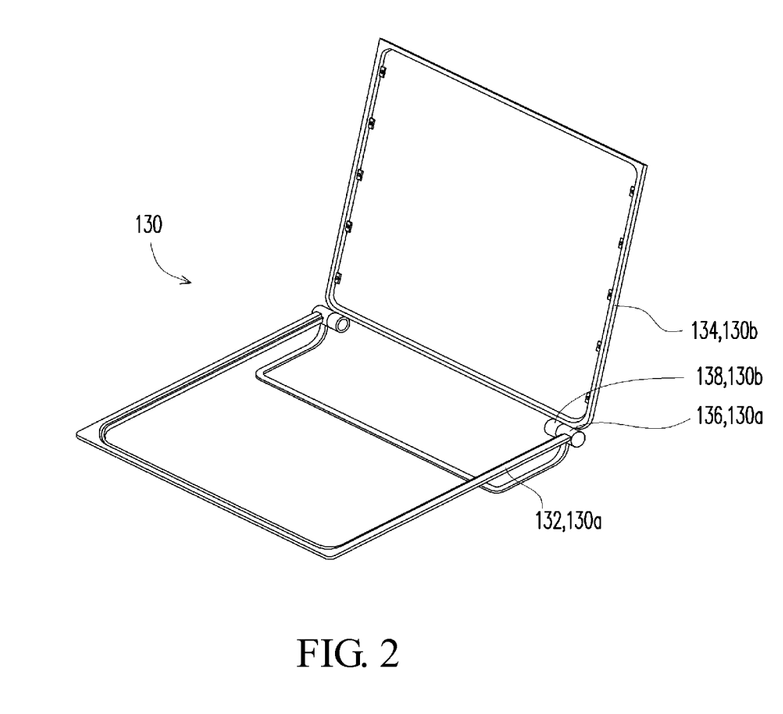
FIG. 2 is a three-dimensional diagram showing a supporting structure module in FIG. 1.
Figure 3:
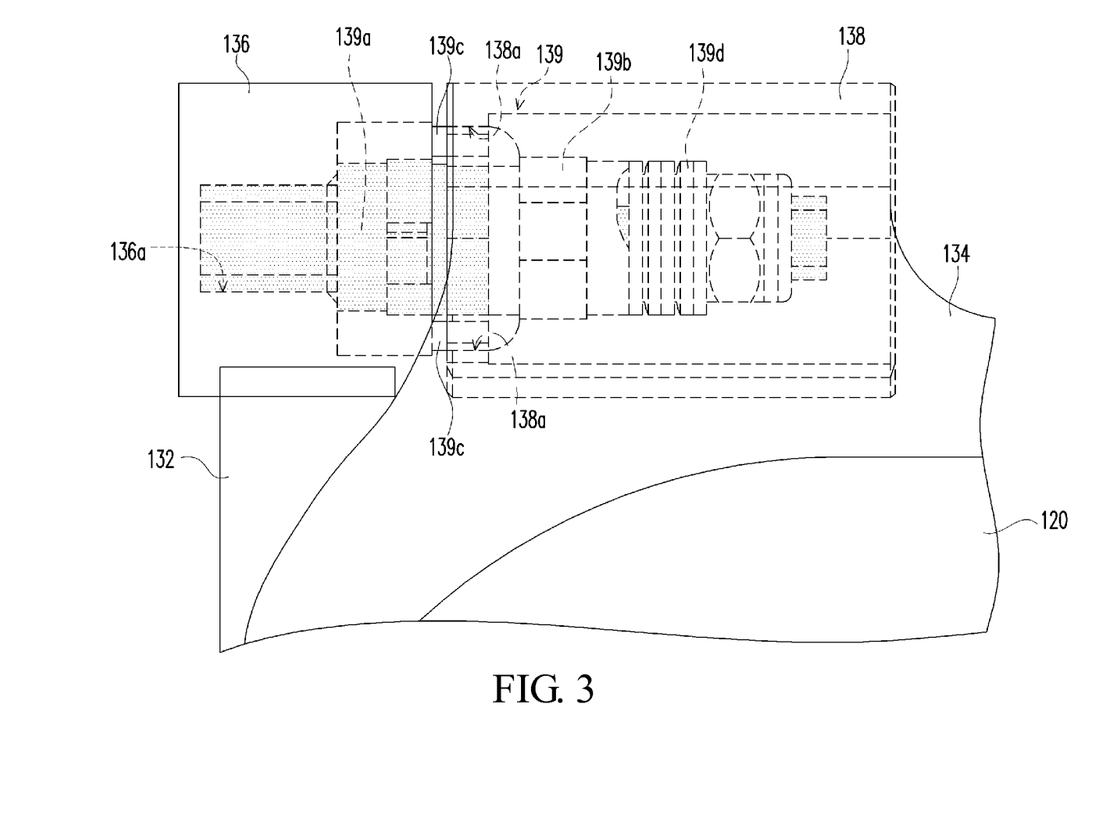
FIG. 3 is a partial perspective diagram showing the supporting structure module in FIG. 1.

FIG. 1 is a three-dimensional diagram showing an electronic device according to one embodiment of this invention. FIG. 2 is a three-dimensional diagram showing a supporting structure module in FIG. 1. FIG. 3 is a partial perspective diagram showing the supporting structure module in FIG. 1. Please refer to FIG. 1 to FIG. 3. An electronic device 100 in the embodiment includes a first casing 110, a second casing 120, a first supporting structure 130a, a second supporting structure 130b, and a hinge 139 (as shown in FIG. 3). The first casing 110 may be a casing of a main body of a notebook computer, and the second casing 120 may be a casing of a display module of the notebook computer.

The first supporting structure 130a includes a first bracket 132 and a first hinge cover 136, and the second supporting structure 130b includes a second bracket 134 and a second hinge cover 138. The first supporting structure 130a and the second supporting structure 130b may be made of an aluminum alloy or a zinc alloy, and they are fixed to and exposed from the first casing 110 and the second casing 120, respectively. In the embodiment, the first hinge cover 136 is connected with the first bracket 132 by integral forming and is exposed from the first casing 110, and the second hinge cover 138 is connected with the second bracket 134 by integral forming and is exposed from the second casing 120. In addition, the first supporting structure 130a, the second supporting structure 130b, and the hinge 139 form the supporting structure module 130 together for improving the whole structure strength of the electronic device 100 and driving the first casing 110 and the second casing 120 to be opened or closed relative to each other.

In detail, the hinge 139 is connected between the first hinge cover 136 and the second hinge cover 138 and is covered by the first hinge cover 136 and the second hinge cover 138. The first hinge cover 136 and the second hinge cover 138 can rotate relative to each other via the hinge 139, thereby driving the second casing 120 to be opened from or closed at the first casing 110. In FIG. 1, the second casing 120 is opened from the first casing 110.

Since the hinge 139 is covered by the first hinge cover 136 and the second hinge cover 138 and is not exposed, an additional exterior element is not needed for covering the hinge 139 in a screwing mode, such that manufacture costs can be reduced and manufacture time can be saved. Further, problems that structure elements cannot cooperate precisely due to the screwing of screws or stress is concentrated can be avoided, thereby reducing probability of structure damage when the first casing 110 and the second casing 120 are rotated relative to each other via the hinge 139. The structure and operation mode of the supporting structure module 130 in the embodiment are described in detail with regard to the drawings hereinbelow.

Figure 4:
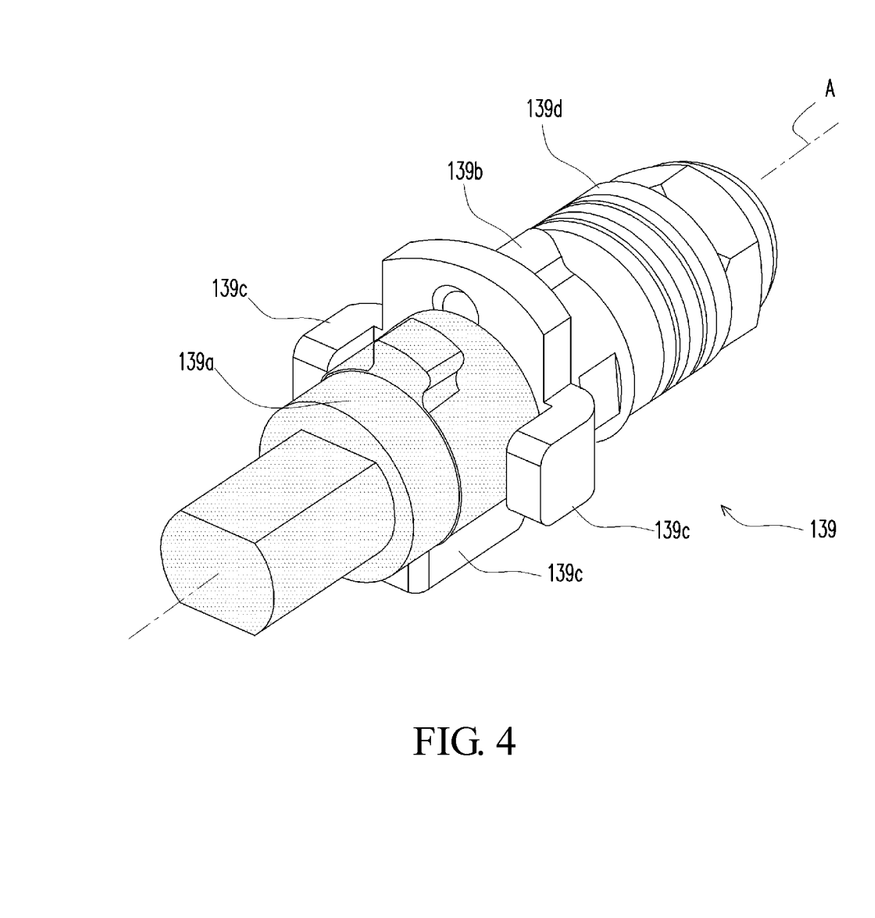
FIG. 4 is a three-dimensional diagram showing a hinge in FIG. 2.
Figure 5:
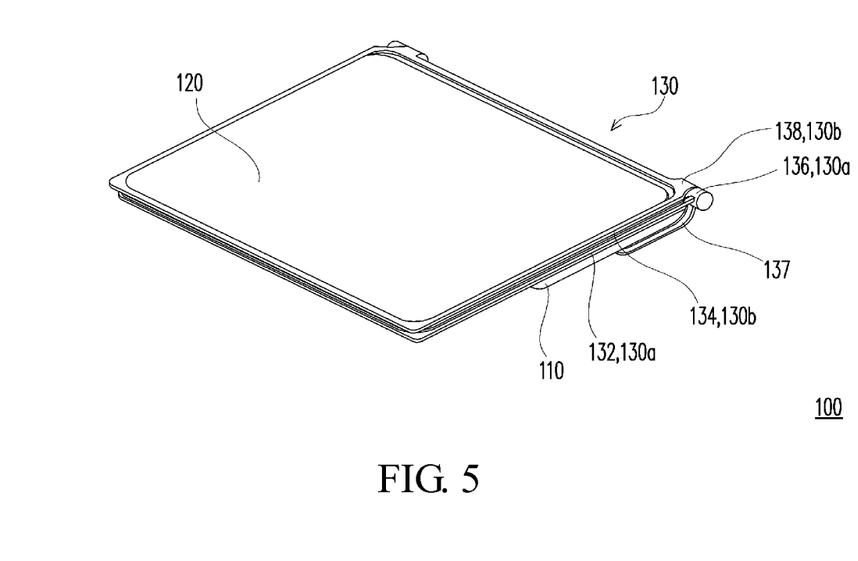
FIG. 5 is a three-dimensional diagram showing a second casing closed at a first casing in FIG. 1.

FIG. 4 is a three-dimensional diagram showing the hinge in FIG. 2. FIG. 5 is a three-dimensional diagram showing the second casing closed at the first casing in FIG. 1. Please first refer to FIG. 3 and FIG. 4. The hinge 139 in the embodiment includes a first shaft 139a and a second shaft 139b. The first shaft 139a is fixedly connected with the first hinge cover 136 (as shown in FIG. 3). The second shaft 139b is fixedly connected with the second hinge cover 138 (as shown in FIG. 3) and is pivotally connected with the first shaft 139a. The first shaft 139a and the second shaft 139b can rotate relative to each other along an axis A (as shown in FIG. 4), thereby driving the first bracket 132 and the second bracket 134 to rotate relative to each other between a state in FIG. 1 and a state in FIG. 5, allowing the second casing 120 to be opened from or closed at the first casing 110.

Figure 6:
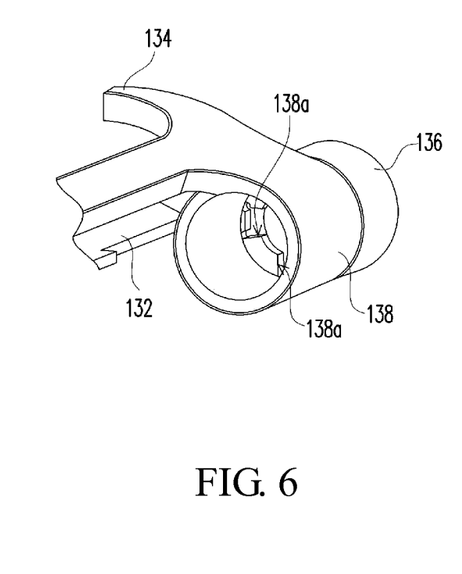
FIG. 6 is a partial three-dimensional diagram showing the supporting structure module in FIG. 1.
Figure 7:
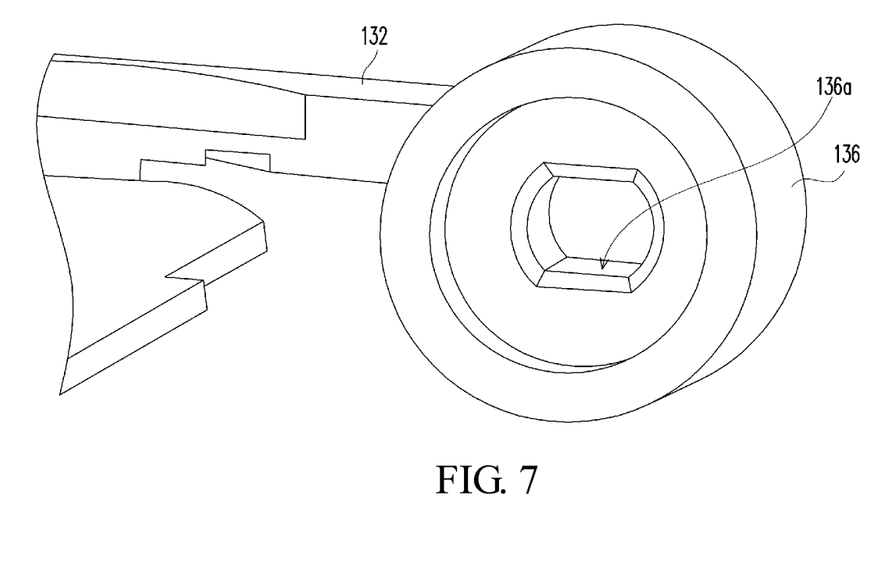
FIG. 7 is a three-dimensional diagram showing a part of structure elements of the supporting structure module in FIG. 6.

FIG. 6 is a partial three-dimensional diagram showing the supporting structure module in FIG. 1. FIG. 7 is a three-dimensional diagram showing a part of structure elements of the supporting structure module in FIG. 6. To allow the drawing to be clear, the second bracket 134 and the second hinge cover 138 in FIG. 6 are not shown in FIG. 7. Please refer to FIG. 3 and FIG. 7. In detail, the first hinge cover 136 in the embodiment has an assembling hole 136a, and a tail end of the first shaft 139a is embedded into the assembling hole 136a, such that the first shaft 139a and the first hinge cover 136 are fixed to each other. The assembling hole 136a in the embodiment may be a non-circular hole, and the tail end of the first shaft 139a is a non-cylindrical structure having the same shape with the assembling hole 136a, such that the rotation of the first shaft 139a can drive the first hinge cover 136 to operate.

Please refer to FIG. 3, FIG. 4, and FIG. 6. The second hinge cover 138 in the embodiment has at least one groove 138a (a plurality of the grooves 138a are shown), and the second shaft 139b has at least one hook 139c (a plurality of the hooks 139c are shown). The second shaft 139b and the second hinge cover 138 are fixed to each other via fastening of the hooks 139c and the grooves 138a, such that the second shaft 139b can rotate to drive the second hinge cover 138 to operate. In addition, please refer to FIG. 3 and FIG. 4. In the embodiment, the hinge 139 further includes a torsion element 139d, and the torsion element 139d is connected with the first shaft 139a and the second shaft 139b. The first shaft 139a and the second shaft 139b need to resist torsion force provided by the torsion element 139d to rotate relative to each other, preventing the first shaft 139a and the second shaft 139b from rotating relative to each other due to improper force in an unexpected condition for a user.

Please refer to FIG. 1 and FIG. 2. In the embodiment, the supporting structure module 130 further includes a supporting bracket 137. The supporting bracket 137 is connected with the first hinge cover 136 and can support the first casing 110 on a surface 50 (as shown in FIG. 1), such that the electronic device 100 and the surface 50 have a particular angle, allowing the user to comfortably operate the electronic device 100. The surface 50 in FIG. 1 may be a table top or other proper surfaces suitable for placing the electronic device 100.

Figure 8:
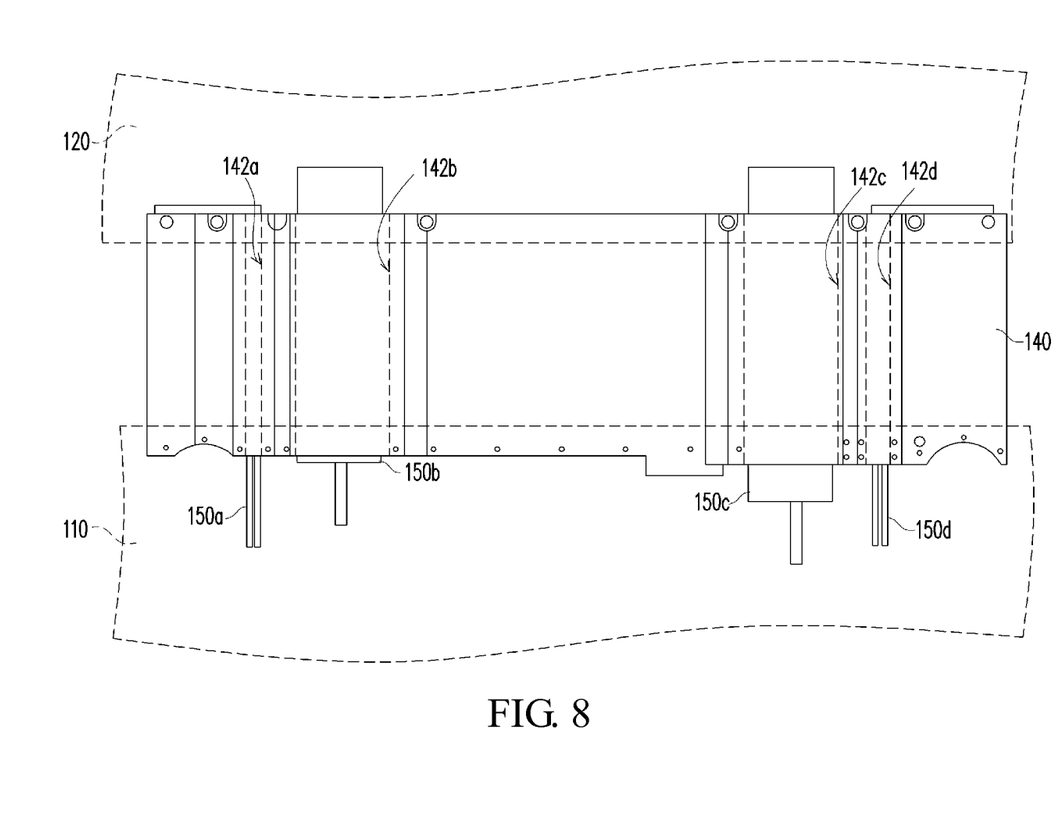
FIG. 8 is a schematic diagram showing a cable covering structure in FIG. 1.

FIG. 8 is a schematic diagram showing a cable covering structure in FIG. 1. Please refer to FIG. 1 and FIG. 8. In the embodiment, the electronic device 100 further includes a cable covering structure 140, and the cable covering structure 140 is connected between the first casing 110 and the second casing 120 and has a plurality of passages 142a to 142d (as shown in FIG. 8) extending between the first casing 110 and the second casing 120. A plurality of cables 150a to 150d (as shown in FIG. 8) of the electronic device 100 are connected between the first casing 110 and the second casing 120 via the passages 142a to 142d thus to be hidden via the covering of the cable covering structure 140. The cables 150a to 150d may include a low-voltage differential signal (LVDS) cable, an antenna cable, or a camera cable. The cable covering structure 140 may be made of rubber to be elastically deformed with the relative rotation of the first casing 110 and the second casing 120.

The first bracket 132 in the embodiment extends along edges of the first casing 110, and the second bracket 134 extends along edges of the second casing 120 thus to effectively strengthen the structure strength of the electronic device 100. In addition, the number of the first hinge cover 136 is two, and the first hinge covers 136 are disposed at two ends of a side of the first bracket 132 adjacent to the second casing 120, respectively. The number of the second hinge cover 138 is two, and the second hinge covers 138 are disposed at two ends of a side of the second bracket 134 adjacent to the first casing 110, respectively. The number of the hinge 139 is also two, and each of the hinges 139 is disposed in the corresponding first hinge cover 136 and the second hinge cover 138. Thereby, the two hinges 139 have enough space therebetween to contain the cable covering structure 140, such that the cables 150a to 150d (as shown in FIG. 8) of the electronic device 100 can be connected between the first casing 110 and the second casing 120 via the cable covering structure 140.

To sum up, the hinge in the embodiment of the invention is covered by the hinge cover of the supporting structure and is not exposed. Thus, the additional exterior element is not needed for covering the hinge in the screwing mode, such that the manufacture costs can be reduced and the manufacture time can be saved. Further, the problems that the structure elements cannot cooperate precisely due to the screwing of the screws or the stress is concentrated may be avoided, thereby reducing the probability of the structure damage when the first casing and the second casing are rotated relative to each other via the hinge. In addition, the cable covering structure made of rubber can be disposed between the first casing and the second casing thus to protect the cables connected between the first casing and the second casing.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A supporting structure module used in an electronic device, the electronic device including a first casing, a hinge, and a second casing rotatable relative to the first casing via the hinge, the supporting structure module comprising:
   a first supporting structure including:
      a first bracket fixed to and exposed from the first casing; and
      a first hinge cover connected with the first bracket by integral forming, the first hinge cover exposed from the first casing and covering a part of the hinge; and
   a second supporting structure including:
      a second bracket fixed to and exposed from the second casing; and
      a second hinge cover connected with the second bracket by integral forming, the second hinge cover exposed from the second casing and covering the rest part of the hinge;

wherein the hinge comprises a first shaft fixedly connected with the first hinge cover of the first supporting structure and a second shaft fixedly connected with the second hinge cover of the second supporting structure and pivotally connected with the first shaft.

2. The supporting structure module according to claim 1, wherein the first bracket of the first supporting structure extends along edges of the first casing, the numbers of the hinge and the first hinge cover are two, respectively, and the first hinge covers are disposed at two ends of a side of the first bracket adjacent to the second casing, respectively.

3. The supporting structure module according to claim 2, wherein the second bracket of the second supporting structure extends along edges of the second casing, the number of the second hinge cover is two, and the second hinge covers are disposed at two ends of a side of the second bracket adjacent to the first casing, respectively, and are connected with the two first hinge covers to cover the two hinges together with the two first hinge covers.

4. The supporting structure module according to claim 1, wherein the first hinge cover of the first supporting structure has an assembling hole, and a tail end of the first shaft is embedded into the assembling hole.

5. The supporting structure module according to claim 1, wherein the second hinge cover of the second supporting structure has at least one groove, the second shaft has at least one hook, and the hook is fastened to the groove.

6. The supporting structure module according to claim 1, wherein the hinge further comprises a torsion element connected the first shaft and the second shaft, and the first shaft and the second shaft resist torsion force provided by the torsion element to rotate relative to each other.

7. The supporting structure module according to claim 1, wherein the first supporting structure and the second supporting structure are made of an aluminum alloy or a zinc alloy.

8. The supporting structure module according to claim 1, further comprising a supporting bracket connected with the first hinge cover of the first supporting structure for supporting the first casing on a surface.

9. An electronic device comprising:
   a first casing;
   a hinge;
   a second casing rotatable relative to the first casing via the hinge;
   a first supporting structure including:
      a first bracket fixed to and exposed from the first casing; and
      a first hinge cover connected with the first bracket by integral forming, the first hinge cover exposed from the first casing and covering a part of the hinge; and
   a second supporting structure, the second supporting structure including:
      a second bracket fixed to and exposed from the second casing; and
      a second hinge cover connected with the second bracket by integral forming, the second hinge cover exposed from the second casing and covering the rest part of the hinge;
   wherein the hinge comprises a first shaft fixedly connected with the first hinge cover of the first supporting structure and a second shaft fixedly connected with the second hinge cover of the second supporting structure and pivotally connected with the first shaft.

10. The electronic device according to claim 9, wherein the first bracket of the first supporting structure extends along edges of the first casing, the numbers of the hinge and the first hinge cover are two, respectively, and the first hinge covers are disposed at two ends of a side of the first bracket adjacent to the second casing, respectively.

11. The electronic device according to claim 10, wherein the second bracket of the second supporting structure extends along edges of the second casing, the number of the second hinge cover is two, and the second hinge covers are disposed at two ends of a side of the second bracket adjacent to the first casing, respectively, and are connected with the two first hinge covers to cover the two hinges together with the two first hinge covers.

12. The electronic device according to claim 10, further comprising a cable covering structure connected with the first casing and the second casing and located between the two hinges, wherein the cable covering structure has a plurality of passages extending between the first casing and the second casing, and a plurality of cables of the electronic device are disposed in the passages.

13. The electronic device according to claim 12, wherein the cable covering structure is made of rubber.

14. The electronic device according to claim 9, wherein the first hinge cover of the first supporting structure has an assembling hole, and a tail end of the first shaft is embedded into the assembling hole.

15. The electronic device according to claim 9, wherein the second hinge cover of the second supporting structure has at least one groove, the second shaft has at least one hook, and the hook is fastened to the groove.

16. The electronic device according to claim 9, wherein the hinge further comprises a torsion element connected with the first shaft and the second shaft, and the first shaft and the second shaft resist torsion force provided by the torsion element to rotate relative to each other.

17. The electronic device according to claim 9, wherein the first supporting structure and the second supporting structure are made of an aluminum alloy or a zinc alloy.

18. The electronic device according to claim 9, further comprising a supporting bracket connected with the first hinge cover of the first supporting structure for supporting the first casing on a surface.

* * * * *